F. Z. HANSCOM.
TOOTH.
APPLICATION FILED DEC. 3, 1913.

1,268,968.

Patented June 11, 1918.

UNITED STATES PATENT OFFICE.

FRANK Z. HANSCOM, OF ELMHURST, ILLINOIS.

TOOTH.

1,268,968.　　　　Specification of Letters Patent.　　Patented June 11, 1918.

Application filed December 3, 1913. Serial No. 804,386.

*To all whom it may concern:*

Be it known that I, FRANK Z. HANSCOM, a citizen of the United States, residing at Elmhurst, in the county of Dupage and State of Illinois, have invented certain new and useful Improvements in Teeth, of which the following is a specification.

In the construction of sets of artificial teeth, it is exceedingly difficult to secure teeth which are sufficiently strong to serve the usual purposes of mastication, and which are so constructed as to provide proper retention in the plate. The present invention relates to teeth which are particularly adapted for use in constructing sets of teeth with plates of rubber or other suitable material.

The objects of the present invention are to provide teeth which will be exceedingly strong and substantial in their general form and construction; which are so constructed that they may be readily ground or shaped to conform to any special conditions necessary; which are so formed or shaped that they will provide the fullest possible retention, or secure fastening when embedded in the material of the plate; and, in general to provide an improved form of tooth of this character which will have these advantages and such other advantages as will appear from the following description.

In the accompanying drawings illustrating this invention:

Figure 1 is an elevation of a tooth embodying my invention, as seen from the inner or lingual side thereof;

Fig. 2 is a side view of the same;

Fig. 3 is a view similar to Fig. 1, with the rear projection or principal retention portion cut away;

Fig. 4 is a side view of the tooth as shown embedded in a plate; and,

Fig. 5 is a sectional view on line 5—5 of Fig. 4, showing two teeth in position in the plate.

As illustrated in these drawings, 6 represents the main or body portion of the tooth which may be made in a variety of shapes to conform to special conditions, but which is preferably made in substantially the form shown. The rear or lingual side of the tooth adjacent to the cutting edge 7 is preferably slightly concaved, as indicated at 8, and the rear portion at the opposite end is also slightly concaved, as indicated at 9. These two surfaces are connected by the main back surface of the tooth, which is indicated at 10, this surface also being preferably made slightly concave. A lug or projection 11, which is formed integrally with the body of the tooth, projects from the back surface 10, and the upper and lower surfaces 12 and 13, of this projection, as shown in the drawings, are substantially continuations of the convex portions 8 and 9. The surfaces 12 and 13 are joined by a substantially flat surface 14. The sides 15 and 16 of the projection 11 converge from the outer portion of the projection toward the surface of the tooth, and also converge from the cervical end of the tooth toward the cutting edge, as clearly indicated in Figs. 3 and 5.

When my improved tooth is secured in the material of the plate 17, as indicated in Fig. 4, the labial portion of the rubber of the plate is preferably brought out slightly over the upper or cervical end of the tooth as indicated at 18. The surface of the plate then recedes as indicated at 19 toward the back of the tooth, and then coincides with the surface 15. The lower surface of the plate 17 is preferably in alinement with the surface 13, the material of the plate flowing around the sides of the projection 11, so that it is thoroughly embedded in the same, as will be understood from Figs. 4 and 5. When two of these teeth are arranged in proximity to each other, as indicated in Fig. 5, there will be a portion of the plate between the adjacent projection 11, which is of substantially keystone form, which will tend to hold the lower or cutting edges of the teeth securely in position, while the upper or cervical ends of the teeth are embedded in cup-like recesses in the plate.

From this description it will be clearly apparent that I provide a tooth which has no sharp or angular projections which are apt to be easily broken, and it will be particularly noted that the lower or cutting portion of the tooth is exceedingly strong, and is well braced or reinforced by the inwardly extending retention projection. While any suitable material may be used for the construction of the tooth it is especially adapted for porcelain, as there are no weak or fragile portions and it requires no pins for holding it in position. It will be particularly noted that the projection on the back of the tooth should be made as thick as possible so as to give a substantial area to be engaged by the rubber of the plate, and so as to give as favorable leverage as possible to the supporting portion. When pressure is brought upon the cutting edge of the tooth when mounted as shown in the drawings, the principal force tends to press the tooth against the plate, but there is also some tendency toward forcing out the cutting edge of the tooth. In the latter case the cervical end of the tooth acts as the fulcrum, and the turning movement must be resisted by the pull on the projection, which pull is easily resisted in my improved form of tooth on account of the converging sides of the projection. The upper surface of the projection 11, as well as the surface 9 at the rear of the cervical end of the tooth, conforms as closely as possible with the adjacent inner surface of the plate, which engages with the gum, and the lower surface 13 of the projection conforms as closely as possible with the under surface of the plate. This arrangement permits these projections to extend inwardly a considerable distance without weakening the plate, as they are embedded in the portion of the plate which may be made relatively thick. The converging of the sides 15 and 16 toward the cutting edge of the tooth permits the material of the plate between two adjacent teeth to be made wider than would otherwise be possible, which serves to strengthen the plate around the portions receiving the greatest strain, and yet does not weaken the teeth as the material of the plate serves to back up or strengthen the teeth adjacent to the cutting edge.

It will, of course, be apparent that such teeth must be made in various sizes and shapes to conform to different conditions and therefore, I do not wish to limit myself to the exact construction shown or described, except as specified in the appended claim, in which I claim:

A tooth for plates, comprising a body portion with an integrally formed projection on the back thereof, said projection having a concavely curved lower surface merging into the lower surface of the cutting edge of the tooth, and adapted to aline with the lower surface of the plate, said projection also having a concavely curved upper surface which merges into the inner surface of the cervical end of the tooth, the sides of said projection also being undercut to permit the material of the plate to securely clasp the same.

FRANK Z. HANSCOM.

Witnesses:
G. P. LENNARTZ,
LEE J. PITNER.